United States Patent [19]

Yamazaki et al.

[11] Patent Number: 5,065,329

[45] Date of Patent: Nov. 12, 1991

[54] LASER OSCILLATOR CONTROL METHOD FOR CHANGING A CURRENTLY EXECUTING COMMAND PROGRAM

[75] Inventors: Etsuo Yamazaki; Tsuyoshi Nagamine; Shigeru Isohata, all of Hachioji, Japan

[73] Assignee: Fanuc Ltd., Minamitsuru, Japan

[21] Appl. No.: 565,897

[22] Filed: Aug. 10, 1990

Related U.S. Application Data

[63] Continuation of Ser. No. 273,514, filed as PCT JP88/00186 Feb. 19, 1988, published as WO88/06939 Sep. 22, 1988, abandoned.

[30] Foreign Application Priority Data

Mar. 20, 1987 [JP] Japan .................. 62-066779

[51] Int. Cl.⁵ .................. G06F 3/00; G06F 19/10
[52] U.S. Cl. .................. 364/474.08; 364/193; 364/221.9
[58] Field of Search .......... 364/221.9, 227, 192–193, 364/474.08

[56] References Cited

U.S. PATENT DOCUMENTS

| 3,969,723 | 7/1976 | Kennicott ............. 364/200 |
| 4,074,349 | 2/1978 | Ueda . | |
| 4,555,610 | 11/1985 | Polad et al. ............. 364/189 |
| 4,590,572 | 5/1986 | Imanishi ............. 364/192 |
| 4,706,002 | 11/1987 | Fukuyama ............. 364/192 |
| 4,947,315 | 8/1990 | Sokolow et al. ............. 364/200 |

FOREIGN PATENT DOCUMENTS

0008773  3/1980  European Pat. Off. .

OTHER PUBLICATIONS

International Application Publication No. WO 85/01233, published Mar. 25, 1985.

Primary Examiner—Gail O. Hayes
Attorney, Agent, or Firm—Staas & Halsey

[57] ABSTRACT

A laser machining control method using a numerical control system for controlling an X-Y table. A command program (2) in a memory is read out for each one block to cause a lamp on an operation panel (5) to be lit. An operator changes, sets and inputs an output power (S), a frequency (P) and a pulse duty (Q) depending on required conditions. The input conditions are applied to a high-frequency power source (6), and laser machining is carried out under these conditions.

1 Claim, 1 Drawing Sheet

LASER OSCILLATOR CONTROL METHOD FOR CHANGING A CURRENTLY EXECUTING COMMAND PROGRAM

This is a continuation of copending application Ser. No. 07/273,514 filed on Nov. 3, 1988 now abandoned.

BACKGROUND OF THE INVENTION

The present invention relates to a laser machining control method, and more particularly to a laser machining control method wherein laser machining is carried out while the contents of a command program are changed.

Today, laser machining equipment including a numerical control system is widely used. In such laser machining equipment, an X-Y table is controlled by the numerical control system, a work is positioned on the X-Y table so that the work is subject to machining such as cutting by a laser beam emitted from a stationary laser oscillator.

Machining by laser machining equipment is performed according to predetermined command programs. The command programs include programs for movement of an X-Y table, an output power, a pulse frequency and a duty of a laser beam or the like.

In laser machining, however, it is generally difficult for machining conditions to be determined theoretically, and so, during an actual machining operation, the conditions are determined in many instances while machining is in progress. Thus, it is extremely troublesome for an operator to change the program each time machining conditions are changed.

SUMMARY OF THE INVENTION

It is an object of the present invention for solving the aforesaid problem to provide a laser machining control method wherein laser machining is carried out while the contents of a command program are changed.

In order to solve the aforesaid problem, the present invention provides a laser machining control method for performing laser machining by controlling an X-Y table with a numerical control system, comprising a method of interpreting and transferring a command program for each block, distributing a pulse to the X-Y table and changing the transferred command program, and simultaneously determining machining conditions according to the changed command program.

Since the command program is interpreted and transferred for each block and executed while it is changed, machining can be carried out while the machining conditions are changed without changing the program.

DESCRIPTION OF THE PREFERRED EMBODIMENTS

Figure 1:
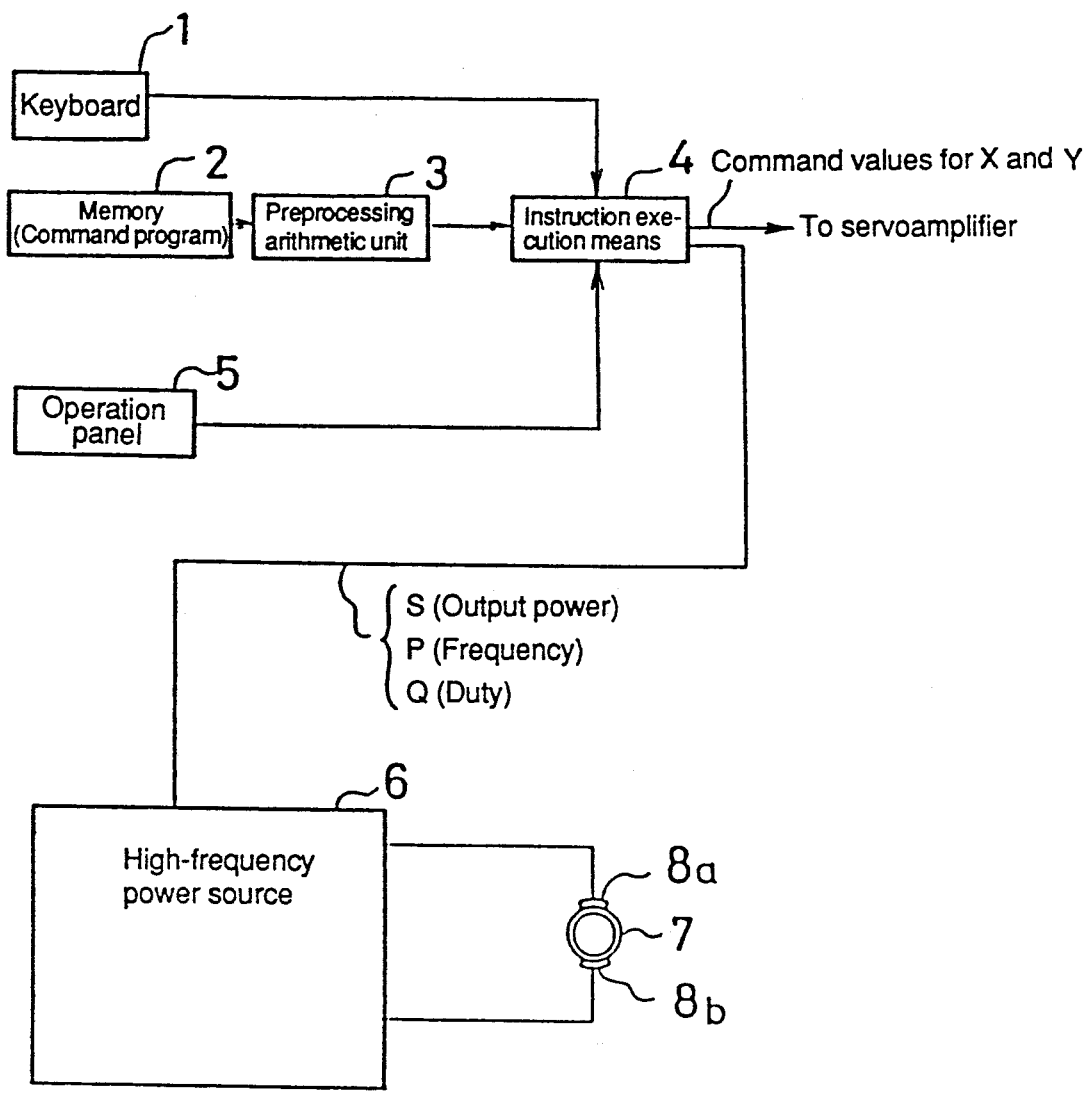
FIG. 1 is a blcok diagram of a laser machining control system according to an embodiment of the present invention.

An embodiment of the present invention will hereinafter be described in detail with reference to the drawing.

FIG. 1 is a block diagram of a laser beam system according to for an embodiment of the present invention, wherein denoted at 1 is a keyboard for inputting machining data or the like through which an operator can input necessary machining conditions and 2 is a memory for storing the data input from a tape reader and the like. Denoted at 3 is a preprocessing arithmetic unit for reading out and interpreting the contents of a command program for each block for changing the command program to an executable form.

For example, the command program or a machining program is instructed in the following form:

| G01 | X3000 | Y5000 | | F2000 |
|-----|-------|-------|----|-------|
| S600 | P100 | Q5 | CR | | where G01 represents a linear cutting, X and Y are movement commands F represents a cutting speed, S represents a laser output power, P represents an output frequency of a pulse output, and Q represents a pulse duty of an output. More particularly, the preprocessing arithmetic unit 3 reads out and interprets the machining program and changes it into executable information.

Denoted at 4 is an instruction execution means for executing a command for one block. The command comprises a pulse distribution command applied to an X-axis and a Y-axis for moving an X-Y table, and an output condition command for determining a laser oscillation condition. The pulse distribution command is used for outputting a distribution pulse for moving the X-axis and the Y-axis. The distribution pulse is transmitted to a non-illustrated servoamplifier, where the distribution pulse is amplified to drive servomotors for moving the X-Y table. The output condition command is used for determining an output power, a frequency, and a duty ratio of a laser beam. A control panel denoted at 5 is provided with an operation button for manually operating the X-Y table, a start button and an override button for output conditions.

Denoted at 6 is a high-frequency power supply for supplying a high-frequency pulse power to a laser tube for effecting laser oscillation. Denoted at 7 is the laser tube. Denoted at 8a and 8b are electrodes, respectively. Laser medium gas passes through the inside of the laser tube 7 so that high-frequency electric discharge takes place inside the laser tube to cause the oscillation and amplification of a laser beam therein.

A machinery control method of the present invention will be described below. When the start button on the operation panel 5 is depressed, a command program for one block stored in the memory 2 is read out to the preprocessing arithmetic unit and converted into an executable form. At the time, a lamp on the operation panel 5 lights to alert the operator of changed machinery conditions and alerts the operator each time one block of command program is converted. If a change is not necessary, the operator depresses an execution button on the operation panel 5. When the machining conditions or output conditions are necessary to be changed, the conditions to be changed are input through the keyboard 1. After changing the conditions, the execution button on the operation panel 5 is depressed. The machining operation can be carried out according to the command program whose contents are changed by repeating the cycle.

The programs changed as necessary can be stored in a separate area of the memory 2 for use with future machinery.

In the aforesaid embodiment in which machining is carried out while the command program is changed, the machining can also be carried out by inputting the output conditions each time the machining is carried out without programming output conditions.

As described above, according to the present invention, since the command program is interpreted, changed and executed for each block, laser machining can be carried out while actual machining conditions are examined.

We claim:

1. A laser oscillator control method for changing a command program and executing laser machining by controlling an X-Y table with a numerical control system, said method comprising the steps of:

(a) reading out a block of command program, from a copy of the program being used for laser machining, stored in a memory and transferring the block of the command program to a preprocessing arithmetic unit;

(b) converting the block of the command program into executable form, laser machining being carried out during converting of the block of the command program into executable form;

(c) lighting a lamp for alerting an operator each time one block of the command program is converted;

(d) changing laser machining conditions of the converted block of the command program by a keyboard or a switch on an operation panel;

(e) depressing an executing button on the operation panel; and (f) executing laser machining with the changed block of machining conditions by distributing a pulse to the X-Y table while simultaneously performing laser machining.

* * * * *